(12) United States Patent
Singer

(10) Patent No.: US 8,961,000 B2
(45) Date of Patent: Feb. 24, 2015

(54) STIRRING SYSTEM WITH INTERSPACED STIRRING ELEMENTS AND BAFFLES, AND METHOD FOR HOMOGENIZING GLASS MELTS

(75) Inventor: Rudolf Singer, Engelstadt (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 1160 days.

(21) Appl. No.: 12/935,457

(22) PCT Filed: Mar. 10, 2009

(86) PCT No.: PCT/EP2009/052756
§ 371 (c)(1),
(2), (4) Date: Sep. 29, 2010

(87) PCT Pub. No.: WO2009/121684
PCT Pub. Date: Oct. 8, 2009

(65) Prior Publication Data
US 2011/0032791 A1 Feb. 10, 2011

(30) Foreign Application Priority Data
Apr. 3, 2008 (DE) .......................... 10 2008 017 045

(51) Int. Cl.
*C03B 5/187* (2006.01)
*B01F 7/20* (2006.01)
(Continued)

(52) U.S. Cl.
CPC ........... *C03B 5/1875* (2013.01); *B01F 7/00125* (2013.01); *B01F 7/00141* (2013.01); *B01F 7/00908* (2013.01); *B01F 7/183* (2013.01)
USPC ........ 366/303; 366/307; 366/325.1; 366/279; 65/178

(58) Field of Classification Search
CPC ...... B01F 7/1675; B01F 7/168; B01F 7/1685; B01F 7/183; B01F 7/186; B01F 15/00915; C03B 5/182; C03B 5/18
USPC ................. 366/279, 342–343, 302–303, 307, 366/325.1, 328.1–328.4, 262–265, 270; 65/178–180
See application file for complete search history.

(56) References Cited

U.S. PATENT DOCUMENTS

| 38,915 | A | * | 6/1863 | Rowan | 366/303 |
| 282,131 | A | * | 7/1883 | Thompson | 241/43 |

(Continued)

FOREIGN PATENT DOCUMENTS

| DE | 198 09 878 A1 | 9/1999 |
| DE | 10 2004 034 798 A1 | 2/2006 |

(Continued)

OTHER PUBLICATIONS

International Search Report for PCT/EP2009/052756, mailed May 25, 2009.

*Primary Examiner* — Charles Cooley
(74) *Attorney, Agent, or Firm* — Smith, Gambrell & Russell LLP

(57) ABSTRACT

A stirring system for molten glass having a stirring vessel and a stirrer; and a method for homogenizing glass melts. The stirrer has a shaft and at least one stirring element, and the stirring vessel has at least two baffles extending from an inner circumferential surface. The stirring element and baffles are formed in such a way that insertion of the stirrer into the stirring vessel requires at least one translatory movement of the stirrer in relation to the stirring vessel, at least one subsequent or simultaneous relative rotation of the stirrer in relation to the stirring vessel, and a further translatory movement of the stirrer in relation to the stirring vessel. In an operating state, the stirrer is rotatable in the stirring vessel.

20 Claims, 12 Drawing Sheets

(51) Int. Cl.
*B01F 7/00* (2006.01)
*B01F 7/18* (2006.01)

(56) References Cited

U.S. PATENT DOCUMENTS

| | | | | |
|---|---|---|---|---|
| 493,603 | A | * | 3/1893 | Sibley .............................. 99/621 |
| 1,870,980 | A | * | 8/1932 | Altwegg ........................... 536/69 |
| 2,283,008 | A | * | 5/1942 | Le Bar et al. .................. 366/300 |
| 2,569,469 | A | * | 10/1951 | De Voe ........................ 65/135.4 |
| 2,570,078 | A | * | 10/1951 | Spremulli ....................... 65/180 |
| 2,746,729 | A | * | 5/1956 | Eakins ........................ 65/135.4 |
| 2,750,161 | A | * | 6/1956 | Simmons ..................... 65/135.3 |
| 2,831,664 | A | * | 4/1958 | Spremulli .................. 366/329.1 |
| 2,871,000 | A | * | 1/1959 | Dowling ....................... 366/289 |
| 2,891,777 | A | * | 6/1959 | Gregorius ..................... 366/290 |
| 2,965,362 | A | * | 12/1960 | Flottmann et al. ......... 366/169.1 |
| 3,352,659 | A | * | 11/1967 | Rahe ............................. 65/178 |
| 3,563,710 | A | * | 2/1971 | Dew, Jr. et al. ............... 422/135 |
| 3,638,673 | A | * | 2/1972 | Stanciu ......................... 137/205 |
| 3,709,664 | A | * | 1/1973 | Krekeler et al. .............. 422/225 |
| 4,295,925 | A | * | 10/1981 | Bentvelzen et al. ............ 162/19 |
| 4,838,704 | A | * | 6/1989 | Carver ......................... 366/307 |
| 5,450,368 | A | * | 9/1995 | Kubota ........................ 366/303 |
| 7,127,919 | B2 | * | 10/2006 | Goller et al. ................. 65/135.3 |
| 7,735,340 | B2 | * | 6/2010 | Burdette et al. ............. 65/135.2 |
| 8,256,951 | B2 | * | 9/2012 | Adelsberg et al. ......... 366/328.1 |
| 8,485,717 | B2 | * | 7/2013 | Adelsberg et al. ......... 366/328.2 |
| 8,616,025 | B2 | * | 12/2013 | Yamamoto et al. .......... 65/135.3 |
| 8,726,696 | B2 | * | 5/2014 | Yamamoto et al. .......... 65/135.3 |
| 2008/0151687 | A1 | * | 6/2008 | Adelsberg et al. ........... 366/279 |
| 2011/0032791 | A1 | * | 2/2011 | Singer .......................... 366/307 |
| 2012/0073326 | A1 | * | 3/2012 | Dorfeld et al. .................... 65/27 |
| 2012/0180529 | A1 | * | 7/2012 | Singer ......................... 65/135.3 |

FOREIGN PATENT DOCUMENTS

WO     WO 03048054 A1 * 6/2003 ............. C03B 5/187
WO     2010/098328 A1 * 9/2010

* cited by examiner

STIRRING SYSTEM WITH INTERSPACED STIRRING ELEMENTS AND BAFFLES, AND METHOD FOR HOMOGENIZING GLASS MELTS

FIELD OF THE INVENTION

The invention relates to a stirring system for molten glass, corresponding stirring vessel and stirrer, and methods for assembling such components and for stirring molten glass. It relates in particular to the structural design of stirring systems for glass melts, the stirring elements, stirrers and stirring vessels which are made to match one another in their mode of operation, that is to say the homogenizing of the glass melt.

BACKGROUND

Structural parts consisting of noble metal and noble metal alloys, such as preferably PGM material (PGM=Platinum Group Metals), are used in the glass industry, particularly in plants for melting and hot forming of special glass. These plant components used in melt technology, also called PGM products, serve for melting, refining, transporting, homogenizing and apportioning the liquid glass.

Such structural parts are essentially either structures consisting of solid PGM material or of materials resistant to high temperature (ceramic refractory materials, metallic special materials) with thin-walled, protective PGM cladding, for example in the form of thin sheet metal or a PGM surface coating (applied for example by plasma spraying or flame spraying, etc.).

Plant parts carrying glass melts are often sheet structures of noble metals which are designed as thin-walled pipe systems. The molten glass flows through these at temperatures of between 1000° C. and 1700° C.

On account of their high melting point, PGM materials are distinguished by high temperature resistance and, furthermore, by their high mechanical strength and resistance to abrasion, and are therefore especially suitable for the production of structural parts in plants or plant parts which come into contact with the glass melts. Suitable materials are platinum and alloys of platinum and/or other metals of the platinum group, which may optionally also contain minor amounts of base metals as further alloying components or oxidic additives. Typical materials are refined platinum, platinum-rhodium alloys and platinum-iridium alloys, which contain a small amount of finely distributed refractory metal oxide, such as in particular zirconium dioxide or yttrium oxide, to increase the strength and high-temperature creep resistance.

The glass melting process breaks down into the following phases: melting, refining, conditioning, feeding and forming. To increase the degree of homogenization of the glasses, stirrers are used. Stirring is part of conditioning and consequently takes place after refining and before feeding. The variation in viscosity of the glass with temperature is of fundamental significance for all glass technology. To achieve a homogeneous melt, it must be brought to a temperature at which the dynamic viscosity is $\eta \sim 10^2$ dPa·s. For comparison: at 20° C., water has a viscosity of 0.01 dPa·s, olive oil about $10^2$ dPa·s and honey about $10^4$ dPa·s. Hot processing, that is feeding and forming of glass, is performed at $10^3$ to $10^8$ dPa·s, depending on the process. Consequently, the viscosity of the glass during stirring lies between $10^2$ and $10^4$ dPa·s. At ~1450° C., the dynamic viscosity of borosilicate glass, for example, is $\eta 10^3$ dPa·s.

As the cited data, temperature and dynamic viscosity show, the effective stirring of glass presents a technical challenge.

Stirring is among the most important basic process engineering operations. In its simple form, two or more components are united with one another and distributed within one another by introducing flow movements with the aid of the stirring tool in such a way that a uniform composition in the smallest possible units of volume is obtained.

The following 4 stirring tasks can be defined: homogenization, suspension, dispersion and heat transfer.

Heat transfer, the exchange of heat between the material being mixed and the surrounding medium through the wall of the mixer possibly takes place, but plays a minor role in the design of the stirring systems for glass.

Since, in the case of glass, the main phase and the additional phase are liquids, the stirring task is exclusively that of homogenization. Homogenization is the mixing of solids or liquids that are soluble in one another as well as the equalizing of differences in concentration and/or differences in temperature.

Mixing in turn means in principle the transporting of components of a material being mixed. In this case it is possible to distinguish between 5 individual basic operations, which under some circumstances can lead from one to the other:

Distributive mixing: distributing, blending, particle interchange on the basis of an ordering matrix and random matrix. In physical terms, gravitational force and Coulomb friction have to be overcome.

Dispersive mixing: breaking down aggregates and agglomerates. In this case, the resistance caused by adhesive stresses has to be overcome.

Laminar mixing: stretching, compressing, folding and overcoming Newtonian friction.

Turbulent mixing: creation of turbulent flow(s) in liquids and gases.

Diffuse mixing: concentration equalization by diffusion. Example: fluids at rest.

In case of mixing the highly viscous substance glass, this consequently involves laminar mixing and distributive mixing, this operation being very closely akin to kneading.

Kneading means the mixing of pasty substances of high viscosity. The energy input involved is many times higher than when mixing substances of low viscosity. If the working process of 'kneading' is considered from the point of view of flow behavior, the absence of turbulence may be mentioned as characteristic of the intensity of the mixing operation. The mass transfer takes place by shearing, mechanical division and compression.

The difficulty when processing liquids of high viscosity is the laminar flow behavior. For any mixing process, this behavior means that there are problems in the exchange of the corresponding flow filaments and components to be mixed. In the case of laminar flow, the forces caused by the viscosity (shearing stress, shearing) are dominant.

In order to achieve a defined mixing result, it is a prerequisite that the laminar flow affects the entire volume of the vessel.

In cases of high viscosities, as are usual with glass, only forced feeding can ensure homogenization of adequate quality.

In the prior art of the glass industry, the plant component that is the stirrer undertakes the homogenization of the glass melts in a crucible or stirring part or stirring cell. The stirring vessels always have a cylindrical or slightly conical form with "smooth" walls. In the continuous melting process, the glass is fed to the stirring vessel laterally from the top or the bottom through an inlet pipe. The glass then leaves laterally at a different height than the inlet by means of an outlet pipe or through the bottom of the vessel. The difference in height between the inlet and the outlet makes it possible in a continuous glass melting process to dispense with the force-feeding effect of the stirring element, since the entire volume of glass must pass through the stirring vessel. Consequently, the stirring task is that of laminar and distributive mixing that affects the entire volume of the vessel.

DE 10 2004 034 798 A1 relates to a stirring system for glass melts. In this case, a stirrer with a shaft, which defines a longitudinal axis, and at least two groups of paddles is provided. The paddles respectively comprise a blade, which is aligned parallel to the longitudinal axis, and at least one opening. At least two groups of paddles are positioned on the shaft at a distance from one another. Also provided is at least one group of baffles, which are positioned between two groups of paddles.

SUMMARY OF THE INVENTION

The object of the present invention is to provide improved or alternative stirring vessels for molten glass, corresponding stirring systems and methods for assembling such components and for stirring molten glass.

This object is achieved by the subject matter of the claims.

The present invention particularly concerns a stirring system with a stirrer and a stirring vessel. The stirrer and the vessel are made to match one another in their geometry, and consequently in their mode of operation, in order that an optimum stirring result is achieved. The wall of the cylindrical or slightly conical stirring vessel has a number of baffles in the form of attached or integrated structures, which are designed as two-dimensional or three-dimensional elements, it being possible for the three-dimensional elements to be designed to form part of the wall of the stirring vessel. This produces the following advantages: the surface area of the vessel is increased, which leads to improved shearing of the glass. Furthermore, the liquid is directed by the baffles toward the middle of the vessel, or fed better to the stirrer. This ensures that the stirrer acts on the entire volume of glass.

A stirring vessel according to the invention for molten glass has a longitudinal axis. In this case, the stirring vessel may have a straight and/or curved form. Apart from other surfaces, the stirring vessel has an inner circumferential surface, which may take various forms. The inner surface may be formed by one or more metal sheets. The inner circumferential surface has at least two or more baffles, which extend away from the inner circumferential surface or the wall thereof into the further interior of the stirring vessel. The baffles are arranged at different positions along the longitudinal axis or at different heights of the stirring vessel or the longitudinal axis offset in an angular manner around the longitudinal axis.

The baffles may be offset with respect to one another at one position and/or at adjacent positions of the longitudinal axis around the latter at an angle of 60°, 90°, 120° or 180°. Irregular spacing is likewise possible.

A number of baffles may be provided, respectively attached in at least two groups of at least two baffles each, at a respective position along the longitudinal axis, with adjacent groups of baffles being arranged offset in relation to one another.

A further alternative or additional aspect of the invention relates to a stirring vessel for molten glass with a longitudinal axis and an inner circumferential surface, the inner circumferential surface having at least one baffle which extends from the inner circumferential surface into the interior of the stirring vessel. In this case, the baffle has a contour which—considered transversely in relation to the longitudinal axis—at least partially narrows or tapers essentially away from the inner circumferential surface of the stirring vessel, or is conical.

The contour of the baffle may narrow at least essentially or completely from the inner circumferential surface into the interior of the stirring vessel.

In the case of a further aspect of the invention, at least two, preferably three, baffles may be provided at each position along the longitudinal axis.

The circumferential surface is essentially continuous and round, elliptical or oval in cross section.

The inner circumferential surface of the stirring vessel may be formed by at least one surrounding metal sheet and the baffle/baffles is/are arranged fixedly on the surrounding metal sheet. They may be at least partially machined from the surrounding metal sheet. The baffles may be formed by at least one further metal sheet fixedly arranged on the surrounding metal sheet, preferably by welding or soldering.

The baffles may extend into the interior of the stirring vessel furthest with a central portion and less far with at least one, preferably both, lateral portions.

The baffles may, furthermore, be formed from one or more metal sheets, the outer edge(s) of which is/are adapted at least partly to the inner circumferential surface of the stirring vessel and is/are at least partly connected thereto and preferably has/have at least one transitional or joining line.

The baffles have at least one first face, which has a first orientation, and a second face with a second orientation that differs from the first orientation.

The first and second faces may also be inclined in relation to one another at an angle of approximately 30° to 120°, preferably approximately 45° to 105°, more preferably approximately 60°.

A stirring vessel according to the invention may at least partially, preferably completely, consist of an oxide-dispersion-hardened PGM material, which is suitable in particular for molten glass for optical purposes. In particular in regions in which the stirring vessel comes into contact with molten glass, this material is very corrosion-resistant.

The baffles may have clearances, in order to reduce weight or provide further constrictions for the molten glass.

A further additional or alternative aspect of the invention relates to a stirrer for molten glass which may correspond to the stirring vessel described above. This stirrer likewise has a longitudinal axis, which in the assembled state may coincide with the longitudinal axis of said stirring vessel. Also provided is a shaft, which has at least one stirring element, which extends radially away from the shaft. Furthermore, the stirring element has a contour or, in particular if it rotates, an envelope which at least partially or essentially completely or virtually completely narrows away from the shaft essentially transversely in relation to the longitudinal axis.

The stirrer has a number of stirring elements, which may be respectively arranged in at least two groups of at least two stirring elements each, at a respective position along the longitudinal axis, with adjacent groups of stirring elements being arranged offset in relation to one another.

In a further additional or alternative aspect, the invention relates to a stirring system for molten glass with a stirring vessel or a stirrer as described or claimed above or below. In this case, at least one stirrer is provided with a shaft and at least one stirring element. In this case, the stirring element is formed in such a way that the stirrer can be introduced into the stirring vessel by at least one axial or translatory relative movement of the stirrer in relation to the stirring vessel, at least one subsequent or simultaneous relative rotation of the stirrer in relation to the stirring vessel and a further axial or translatory relative movement of the stirrer in relation to the stirring vessel. In this case it is possible for the stirrer in the operating state to be rotated in the stirring vessel.

The stirring element/elements may be formed in such a way that it/they corresponds/correspond to the contour of the baffle(s) during rotation in the operating state. Furthermore, the stirring element/elements may have a contour or an envelope which narrows away from the shaft.

The stirring system may at least partially, preferably completely, consist of an oxide-dispersion-hardened PGM material.

The stirrer or the stirring element may have clearances, in order to reduce weight or provide further constrictions for the molten glass.

Furthermore, the invention relates to a method for producing a stirring vessel for molten glass with a longitudinal axis. It particularly comprises the following steps: forming an inner circumferential surface, forming the inner circumferential surface with at least two baffles in such a way that the baffles extend from the inner circumferential surface into the interior of the stirring vessel, and arranging the baffles at different positions in relation to the longitudinal axis and offset in an angular manner around the latter.

The invention additionally or alternatively relates to a method for producing a stirring vessel for molten glass with a longitudinal axis, with the steps of: forming an inner circumferential surface, forming the inner circumferential surface with at least one baffle which extends from the inner circumferential surface into the interior of the stirring vessel, and forming or arranging the baffle with a contour which at least partially tapers from the inner circumferential surface into an interior of the stirring vessel essentially transversely in relation to the longitudinal axis.

The invention also relates to a method for assembling a stirring system for molten glass according to at least one of the corresponding embodiments or aspects above, with the following method steps: introducing the stirrer into the stirring vessel by at least one axial or translatory relative movement of the stirrer in relation to the stirring vessel, further subsequent or simultaneous movement by a relative rotation of the stirrer in relation to the stirring vessel and a further axial or translatory relative movement of the stirrer in relation to the stirring vessel.

Furthermore, the invention relates to a method for stirring molten glass with a stirring system according to at least one of the corresponding embodiments or aspects above, with the following method steps: feeding molten glass through an inlet of the stirring vessel, turning the stirrer in the stirring vessel and passing the molten glass through the interior of the stirring vessel, the molten glass being directed by the stirring elements and the baffles through constrictions between them, broken down, kneaded and/or compressed during the turning of the stirrer and passing of the molten glass through the interior of the stirring vessel, and discharging the molten glass through an outlet of the stirring vessel.

BRIEF DESCRIPTION OF THE DRAWINGS

The figures are intended to illustrate preferred embodiments according to the invention by way of example. In the figures.

DETAILED DESCRIPTION

Figure 1A:
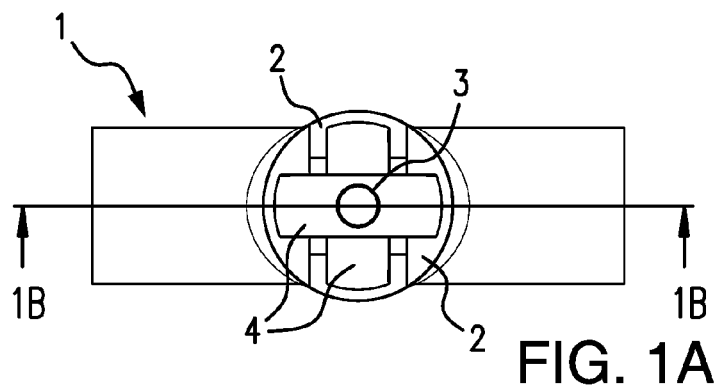
FIG. 1A: shows a schematic representation of a stirring system according to the invention in a view from above in the direction of the longitudinal axis, with an embodiment according to the invention of a stirring vessel with a stirrer corresponding thereto.

FIG. 1A shows a stirrer 3 with a shaft 30, which is rotatably arranged in a stirring vessel 1 of a refining chamber. In this view, the stirring elements 4 that are offset in relation to one another along the longitudinal axis can be seen in particular. In the embodiment represented, the stirring elements 4 are offset in relation to one another by 90°. Baffles 2, which extend inward from an inner wall 10 of the stirring vessel, can also be seen in this plan view. These baffles may protrude completely or partly into the interspaces left by the stirring elements 4.

Figure 1B:
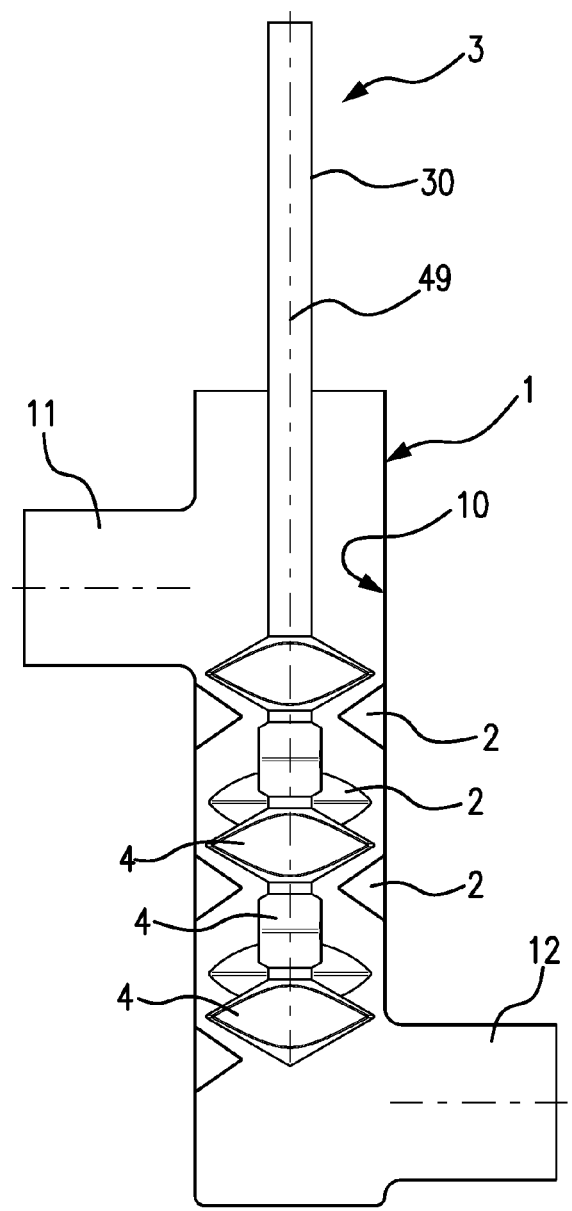
FIG. 1B: shows a schematic sectional representation along 1B-1B according to FIG. 1A.

This functionality is shown still more clearly in FIG. 1B. The conical or narrowing configuration of the baffles 2 toward the interior of the stirring vessel 1 that can be seen in this view is represented. The baffles 2 are attached to the inner circumferential surface 10 of the stirring vessel 1 in such a way that they occupy the clear space between the individual stirring elements 4 of the stirrer and make it much smaller.

In this case, however, only baffles 2 that extend essentially perpendicularly to the plane of the paper in FIG. 1B can be seen. Of the others, only those lying at the rear are represented. The stirring elements 4 can rotate freely during operation, and thereby use much of the space left by the baffles 2. In FIGS. 1A and 1B it can be seen how, although the glass melt can pass from an inlet 11 to an outlet 12, during rotation of the stirrer 3 it is kneaded, sheared and otherwise worked by the stirring elements 4 of said stirrer.

The baffles comprise planar, sloping metal sheets, which are attached tangentially at a distance from the lateral surfaces of the truncated cones (inner wall of the stirring vessel). In each stirring element interspace, two baffles lie mirror-invertedly opposite one another. Along the center axis 30, the baffles are offset radially in an angular manner.

Apart from the concentric arrangement of the stirrer 3 with respect to the stirring vessel 1 that is shown, a non-concentric arrangement may likewise be achieved, with suitable formation of the stirring elements 4 and the baffles 2.

Figure 1E:
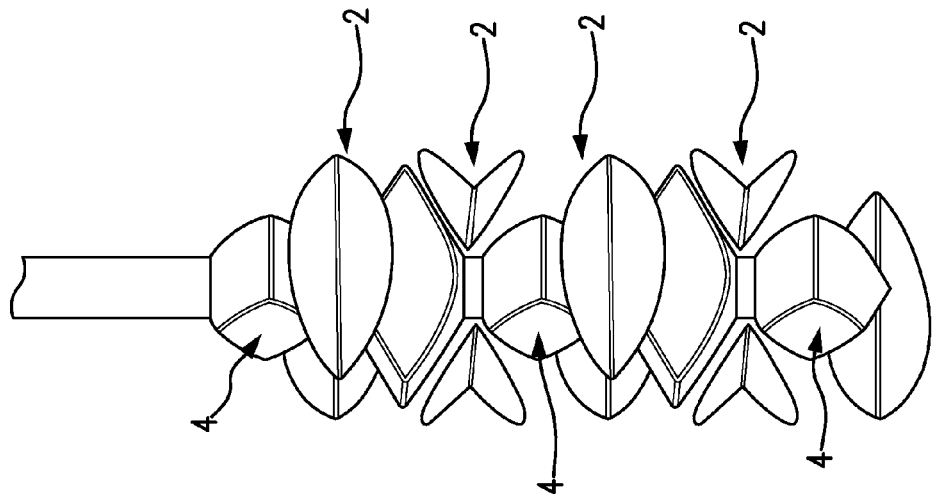
FIG. 1E: shows a representation of the interaction of the stirrer as shown in FIG. 1D and the baffle as shown in FIG. 1C.
Figure 1D:
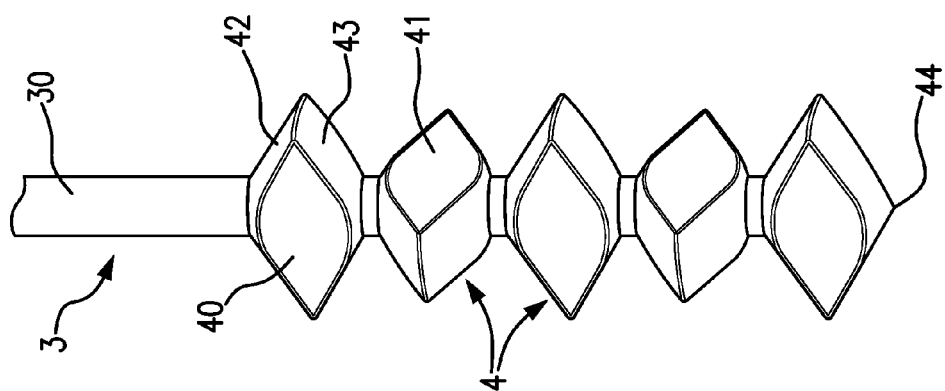
FIG. 1D: shows a perspective representation of a stirrer according to the invention.
Figure 1C:
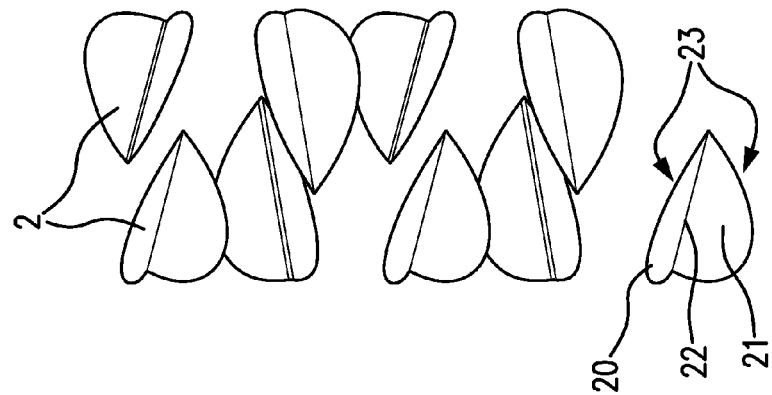
FIG. 1C: shows a schematic representation of baffles according to the invention, on their own without the stirring vessel.

FIG. 1C shows in a perspective view how the baffles 2 may be formed. A first wall 20 and a second wall 21 may be provided, and may have a linear transition 22. Toward the inner wall 10 (not represented) of the stirring vessel, corresponding outer sides 23 are provided, lying completely up against the inner wall 10 or connected thereto. Gaps (not represented) between the inner wall and the outer sides are also conceivable.

The stirrer 3 is perspectively shown in FIG. 1D. On the shaft 30 there are the stirring elements 4, which are spaced apart along a longitudinal axis (not shown) of the stirrer 3. The individual stirring elements 4, attached on the stirring shaft or the shaft 30, take the form of two truncated cones 42, 43, arranged one inverted on the other and having two mutually parallel, planar first and second faces or metal sheets 40, 41. The planar faces are bounded by hyperbolic edges, which are created by the axially parallel conic sections. The position of the planar faces is offset radially in an angular manner from stirring element to stirring element. The form can also be alternatively described: in the embodiment shown, the stirring elements 4 have a first, essentially planar, face 40 and a second corresponding face 41, which both have a lozenge shape, with the flat angles rounded off. The first and second faces 40, 41 run essentially parallel to the longitudinal axis of the stirrer 3, and the first faces 40 and the corresponding second faces 41 lie opposite one another at the same distance in each case from the longitudinal axis. The stirring elements 4 are respectively closed by a third and a fourth face 42, 43. It is clear how the stirring elements narrow outwardly, in the embodiment shown over the entire length, with the third and fourth faces 42, 43 going over one into the other at a line. This line may be straight or curved. In the embodiment represented, it is slightly curved, so that the line describes a circle, or approximates a circle more than a straight line during rotation of the stirrer. The lowermost stirring element 4 in FIG. 1D has a slight point 44 in the downward direction, which is essentially achieved by corresponding shaping of the fourth face 43.

The interaction of the stirring elements 4 and the baffles 2 is represented in FIG. 1E, the inner wall not being represented for reasons of simplicity. It can be seen how closely the stirring elements 4 fit into the contours formed by the baffles during the rotation of the stirrer.

As a result of the large volumes of the stirring elements 4 and the baffles 2, the molten glass is frequently directed through constrictions as it flows through the stirring vessel. The relative movement between stirring elements and baffles kneads the glass melt. The radially angularly offset arrangement of stirring elements and baffles has the effect that the stream of glass is multiply broken down by the stirring elements at each level.

The radially angular offset of the stirring elements makes it possible in the first place to lower the stirrer into the stirring vessel, by it being alternately lowered by the height of a stirring element and then turned by the angular offset.

Figure 2A:
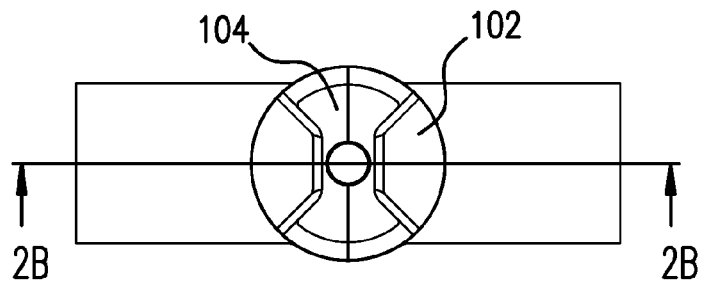
FIG. 2A: shows a schematic representation of a further stirring system according to the invention in the direction of the longitudinal axis, with a further embodiment according to the invention of a stirring vessel with the stirrer corresponding thereto.

FIG. 2A shows modified stirring elements 104, which are formed by essentially horizontally arranged metal sheets and essentially vertically arranged faces. This is, inter alia, a material-saving variant, which, with the material used, can bring with it a greater saving. It is clear in particular in FIG. 2A how the horizontal metal sheets can be angled away. A second, essentially vertically arranged metal sheet, which together with an essentially horizontal metal sheet forms a stirring element, is shaped in such a way that, when the stirrer represented is inserted into the stirring vessel, it fits between the horizontal faces of the baffles when moved in a translatory manner.

Figure 2B:
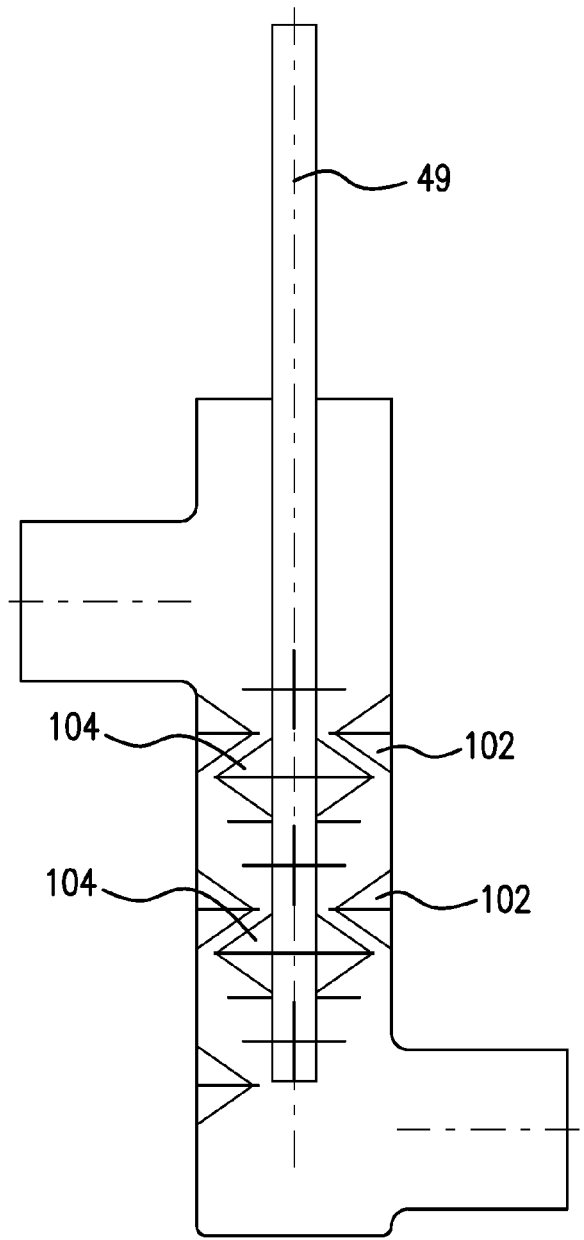
FIG. 2B: shows a schematic sectional representation along 2B-2B according to FIG. 2A.

FIG. 2B shows the interaction of the corresponding baffles 102 and stirring elements 104 in the installed state. It is likewise clear how, with the offset arrangement of the baffles and the stirring elements, during assembly the lowermost stirring element must be moved between the uppermost baffles in a translatory manner, in order then to be turned—here by 90°—and moved in a translatory manner between the two baffles, and so on. The stirring elements arranged further up are moved through the baffles correspondingly.

Figure 2E:
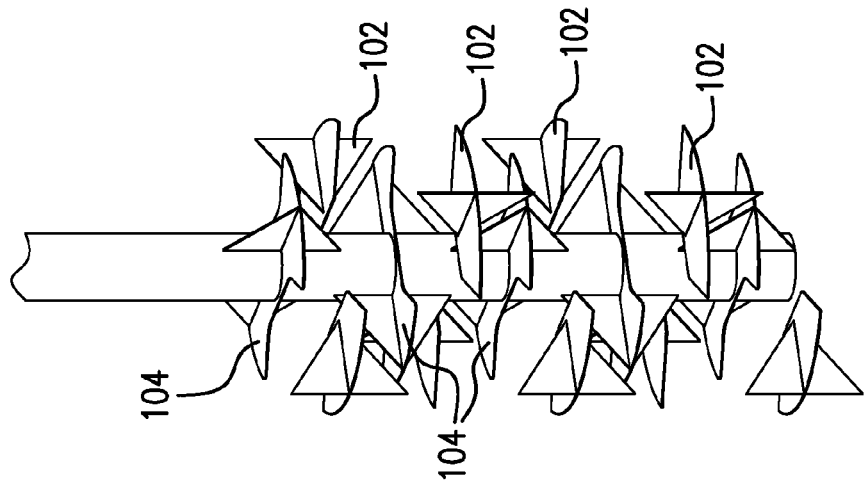
FIG. 2E: shows a representation of the interaction of the stirrer as shown in FIG. 2D and the baffle as shown in FIG. 2C.
Figure 2D:
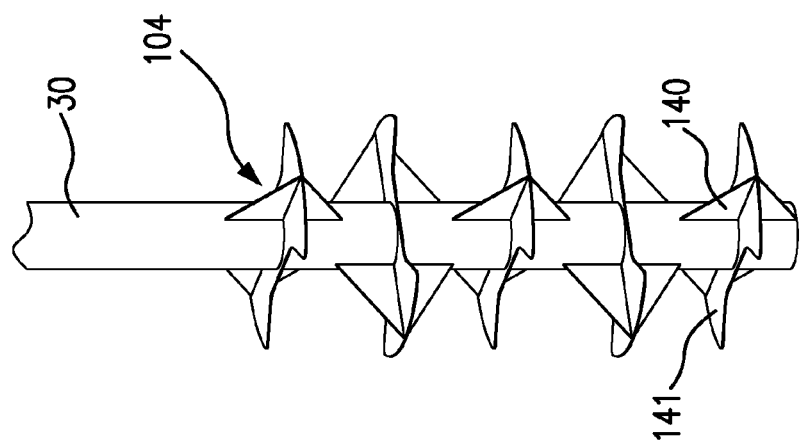
FIG. 2D: shows a perspective representation of a further stirrer according to the invention.
Figure 2C:
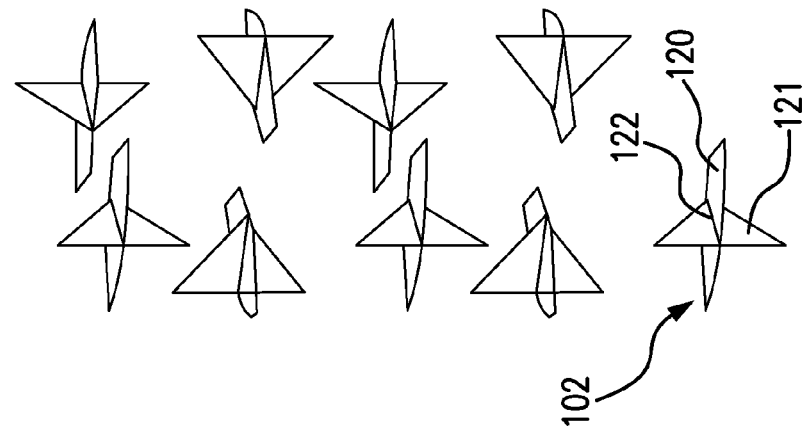
FIG. 2C: shows a schematic representation of further baffles according to the invention, on their own without the stirring vessel.

FIG. 2C shows the form of the baffles 102 according to this embodiment and the component parts, which are either partly fitted together and/or joined together from individual parts and go over one into the other along a line 122. Here the conical contour that is formed from the outside inward by the baffles can be seen. The baffles 102 are attached to the inner circumferential surface (not represented) of the stirring vessel in such a way that they occupy the clear space between the individual stirring blades of the stirrer and make it much smaller. The baffles 102 may be constructed in a way analogous to the stirrer from horizontal and centrally crossing planar vertical metal sheets 120, 121. The horizontal metal sheets have a contour which fills the clear space of the stirring blades. In each stirring blade interspace, two baffles lie mirror-invertedly opposite one another. Along the center axis, the baffles are offset radially in an angular manner.

FIG. 2D shows the shaft 30 with the corresponding stirring elements 104 formed by the metal sheets 140 and 141. The individual stirring elements 104 that are attached on the stirring shaft comprise a dumbbell-shaped, planar, horizontal metal sheet 141 and vertical triangular metal sheets 140. The vertical triangular metal sheets 140 centrally cross the dumbbell-shaped horizontal metal sheets 141 and lie with their base side against the shaft 30, so that their point lies at the outermost circumference of the stirrer. The position of the stirring elements 104 is offset radially in an angular manner in relation to one another.

FIG. 2E shows the interaction of the stirring elements 104 and the baffles 102. The triangular vertical metal sheets 140 in the stirring elements 104 move the glass melt radially. Whenever they run past one another, a constriction between the vertical metal sheets 140 of the stirrer and the baffles 102 of the stirring vessel is regularly created during the rotation. These constrictions compress the glass melt. The horizontal metal sheets, which are fitted both in the stirrer blades and in the baffles, permanently cut up the stream of glass.

Figure 3A:
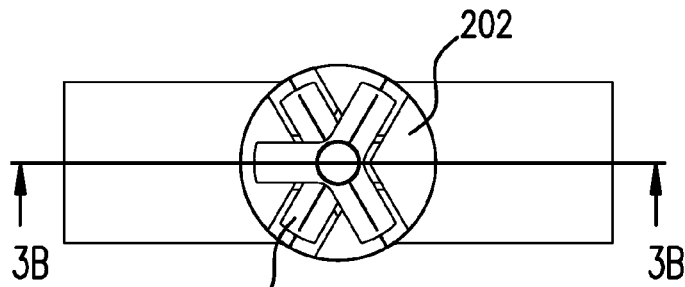
FIG. 3A: shows a schematic representation of a further stirring system according to the invention in the direction of the longitudinal axis, with a further embodiment according to the invention of a stirring vessel with the stirrer corresponding thereto.

According to FIG. 3A, three stirring elements 204 are respectively offset by 120° in relation to one another. Baffles 202 are correspondingly formed, in order to assemble stirrer and stirring vessel as already described above.

Figure 3B:
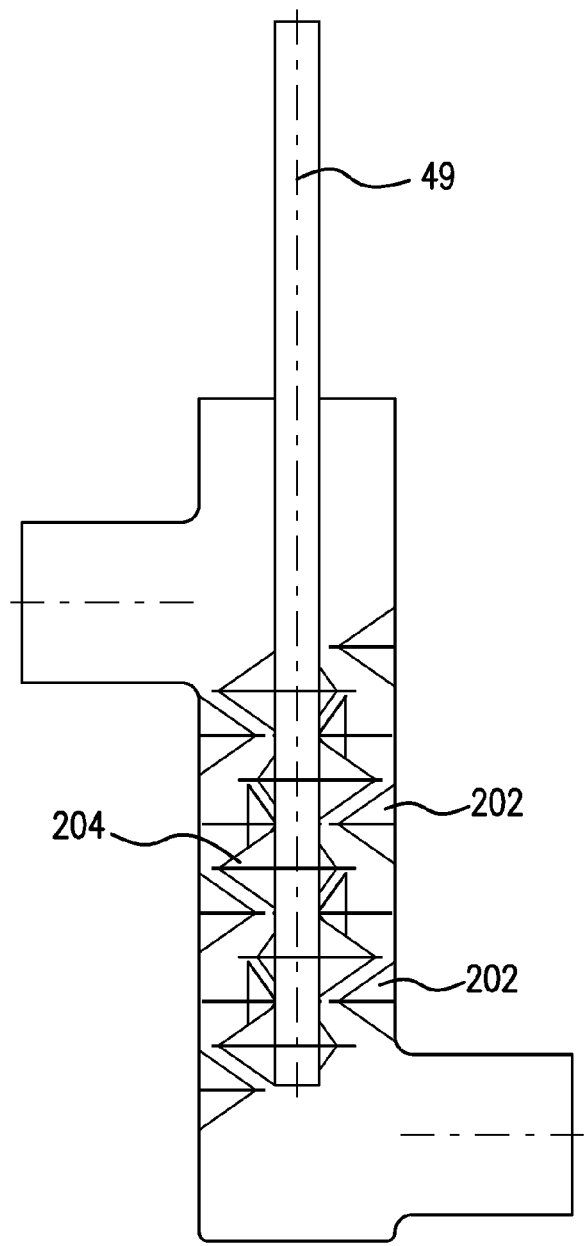
FIG. 3B: shows a schematic sectional representation along 3B-3B according to FIG. 3A.

In FIG. 3B, the conical form of the stirring elements 204 and the baffles 202 can be seen.

Figure 3E:
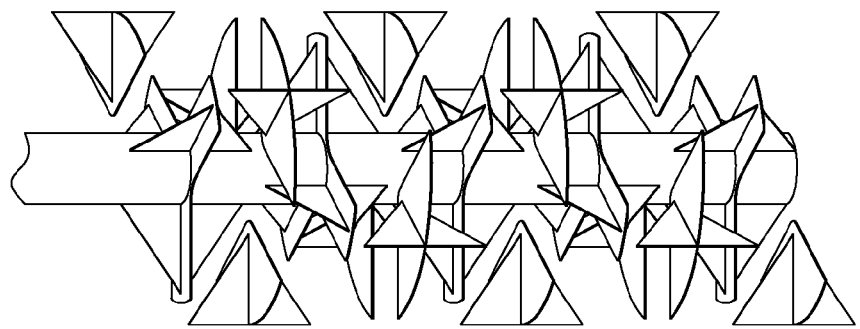
FIG. 3E: shows a representation of the interaction of the stirrer as shown in FIG. 3D and the baffle as shown in FIG. 3C.
Figure 3D:
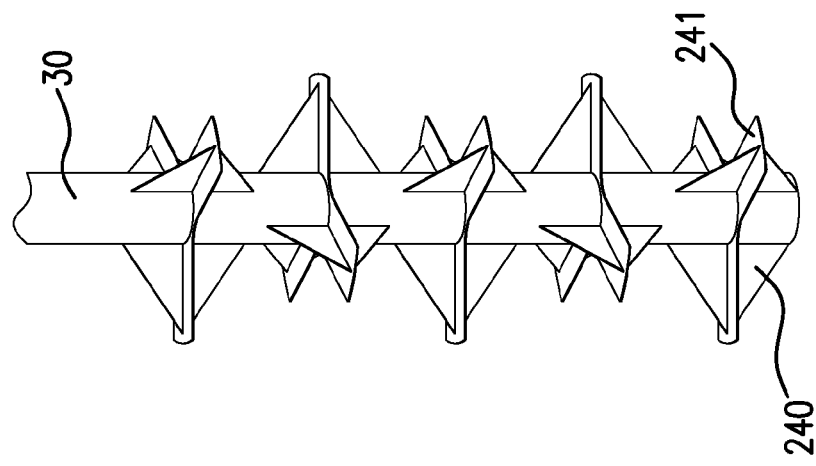
FIG. 3D: shows a perspective representation of a further stirrer according to the invention.
Figure 3C:
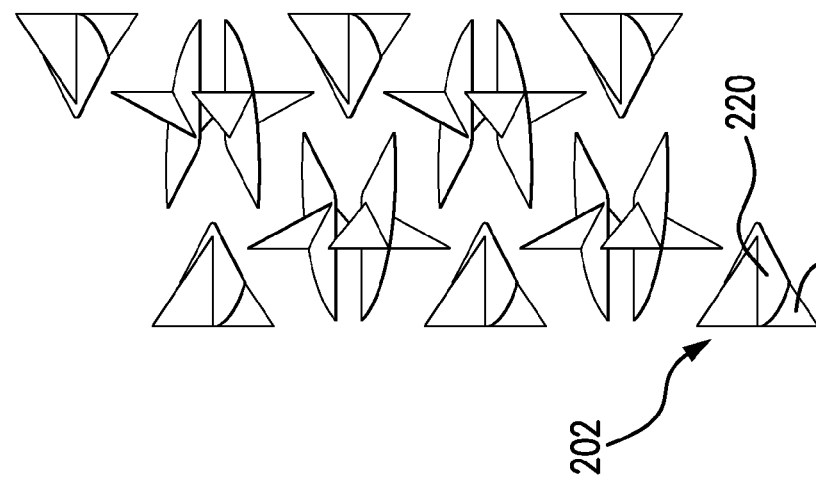
FIG. 3C: shows a schematic representation of further baffles according to the invention, on their own without the stirring vessel.

A corresponding construction of the baffles 202 and the stirring elements 204 is revealed by FIGS. 3C and 3D. These are constructed from metal sheets 220, 221 and 240, 241, respectively, which are aligned essentially transversely in relation to one another. On the inner circumferential surface (not represented) of the stirring vessel, baffles 202 are attached in such a way that they occupy the clear space between the individual stirrer blades of the stirrer and make it much smaller. The baffles 202 are constructed in a way analogous to the stirring elements from horizontal and essentially crossing planar vertical metal sheets 220, 221. The horizontal metal sheets 220 have a contour which fills the clear spaces of the stirring blades. Along the center axis, the baffles are offset radially in an angular manner.

The individual stirring elements 204 that are attached on the stirring shaft or shaft 30 comprise a star-shaped, planar, horizontal metal sheet 241 and vertical triangular metal sheets 240. The vertical triangular metal sheets 240 sit at each point of the star of the horizontal metal sheets 241 and centrally cross them. The vertical metal sheets 240 lie with their base side against the stirrer shaft 30, so that their point lies at the outermost circumference of the stirrer. The position of the stirrer blades is offset radially in an angular manner in relation to one another. It is clear here from the stirring elements that the metal sheets 241 may have an essentially rectangular form.

The functionality can be seen from FIG. 3E and is essentially the same as that described above.

A more complex construction, which may have advantages in stiffness, is shown in FIGS. 4A to 4E. According to FIG. 4A, during assembly the stirring elements 304 can be led through between the baffles 302 in the way already described.

Figure 4A:
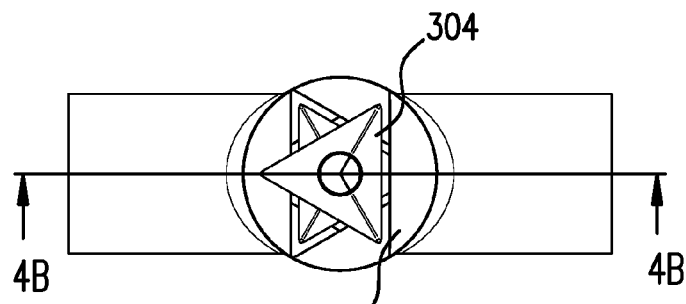
FIG. 4A: shows a schematic representation of a further stirring system according to the invention in the direction of the longitudinal axis, with a further embodiment according to the invention of a stirring vessel with the stirrer corresponding thereto.
Figure 4B:
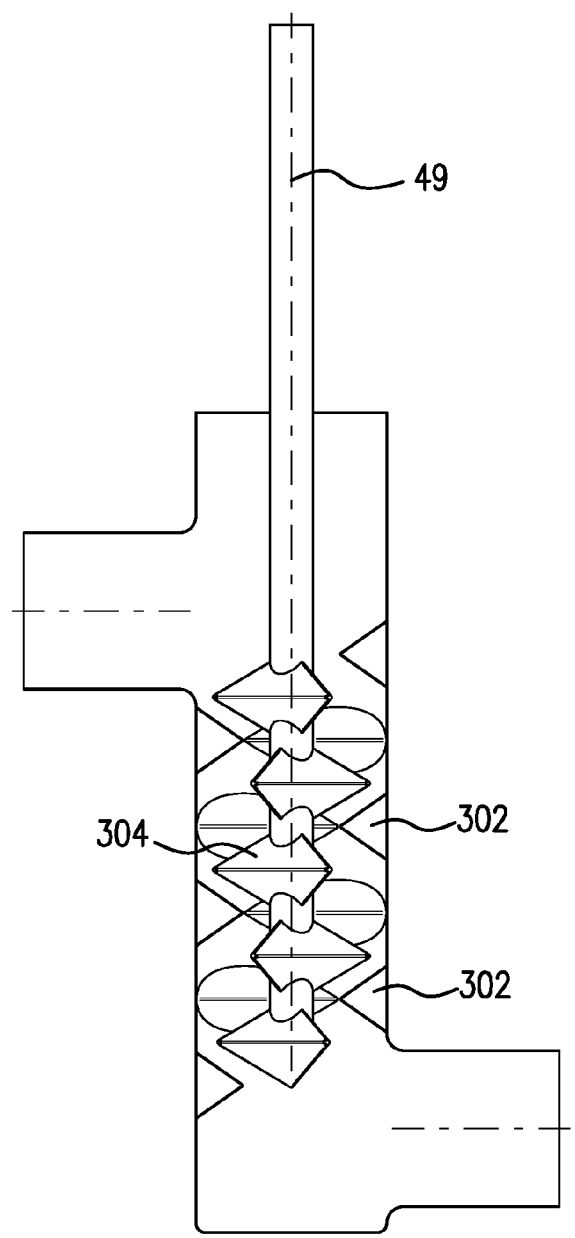
FIG. 4B: shows a schematic sectional representation along 4B-4B according to FIG. 4A.
Figure 4E:
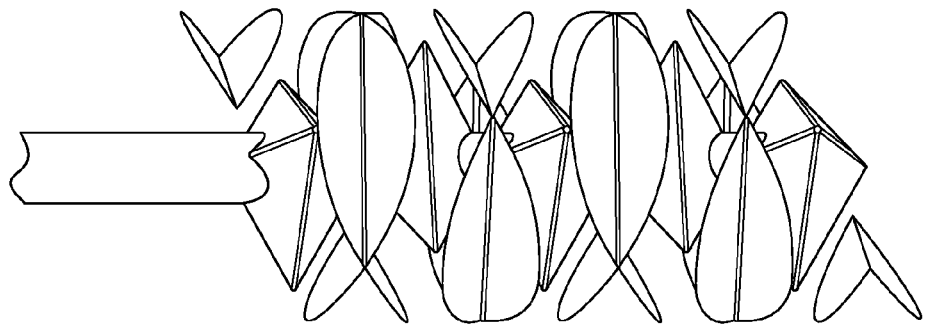
FIG. 4E: shows a representation of the interaction of the stirrer as shown in FIG. 4D and the baffle as shown in FIG. 4C.
Figure 4D:
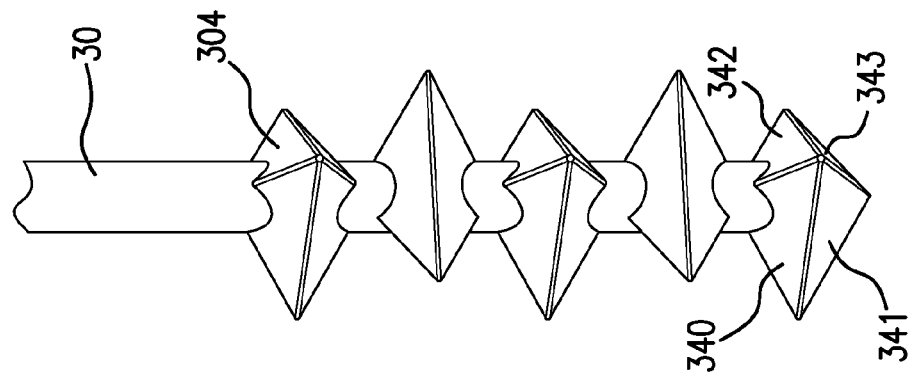
FIG. 4D: shows a perspective representation of a further stirrer according to the invention.
Figure 4C:
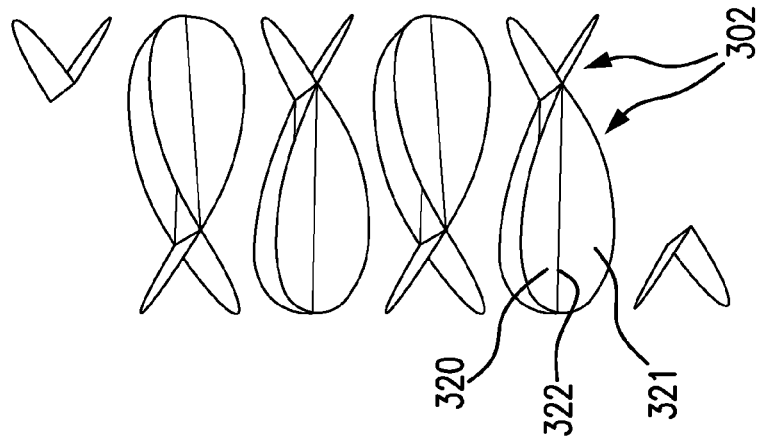
FIG. 4C: shows a schematic representation of further baffles according to the invention, on their own without the stirring vessel.
Figure 5A:
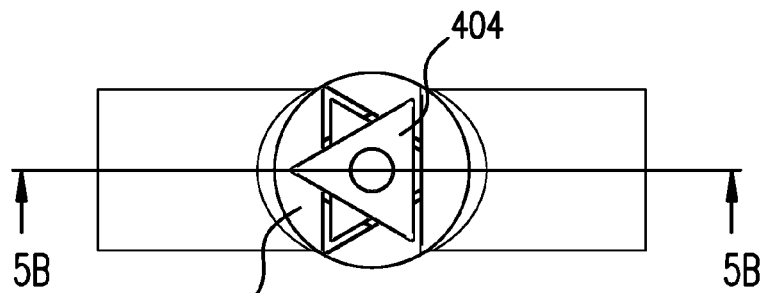
FIG. 5A: shows a schematic representation of a further stirring system according to the invention in the direction of the longitudinal axis, with a further embodiment according to the invention of a stirring vessel with the stirrer corresponding thereto.
Figure 5B:
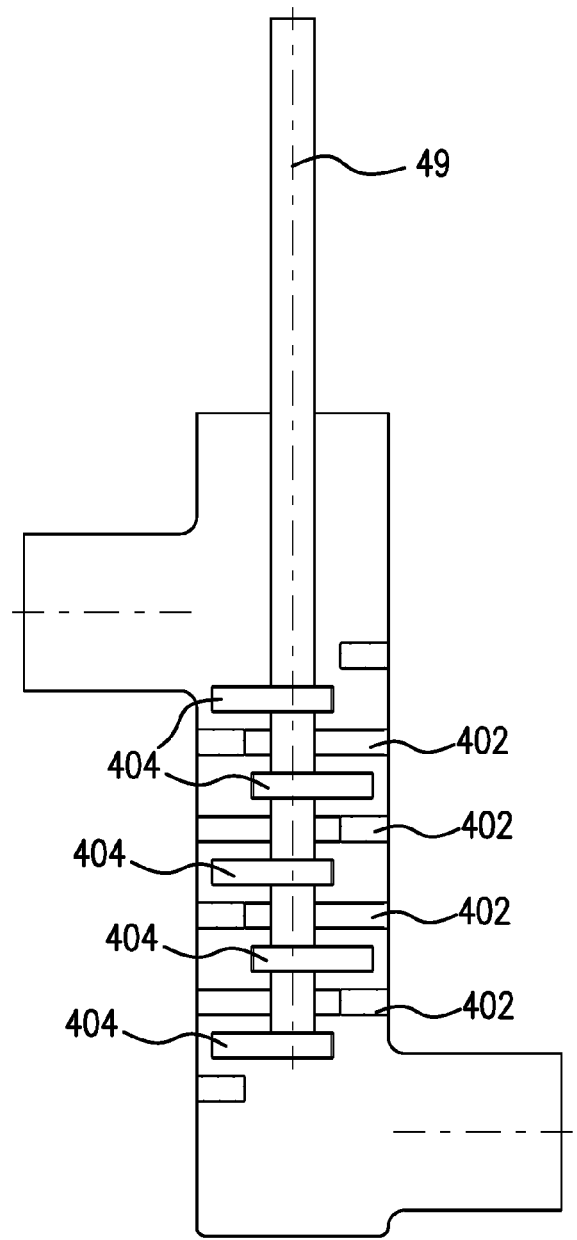
FIG. 5B: shows a schematic sectional representation along 5B-5B according to FIG. 5A.
Figure 5E:
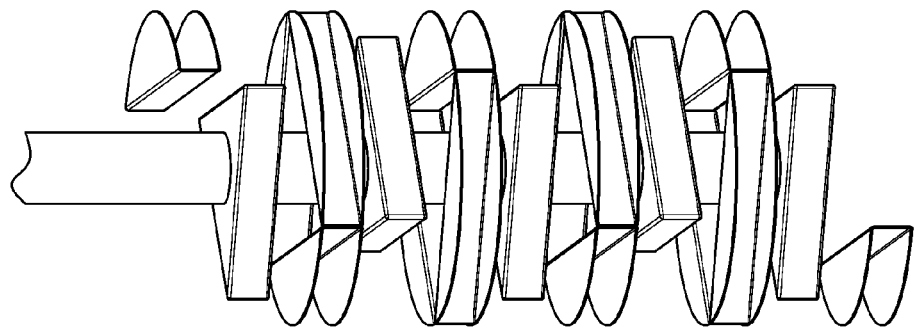
FIG. 5E: shows a representation of the interaction of the stirrer as shown in FIG. 5D and the baffle as shown in FIG. 5C.
Figure 5D:
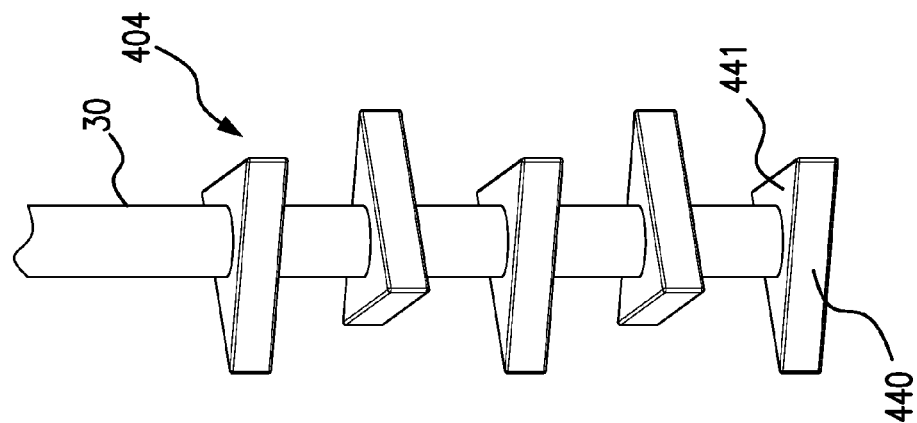
FIG. 5D: shows a perspective representation of a further stirrer according to the invention.
Figure 5C:
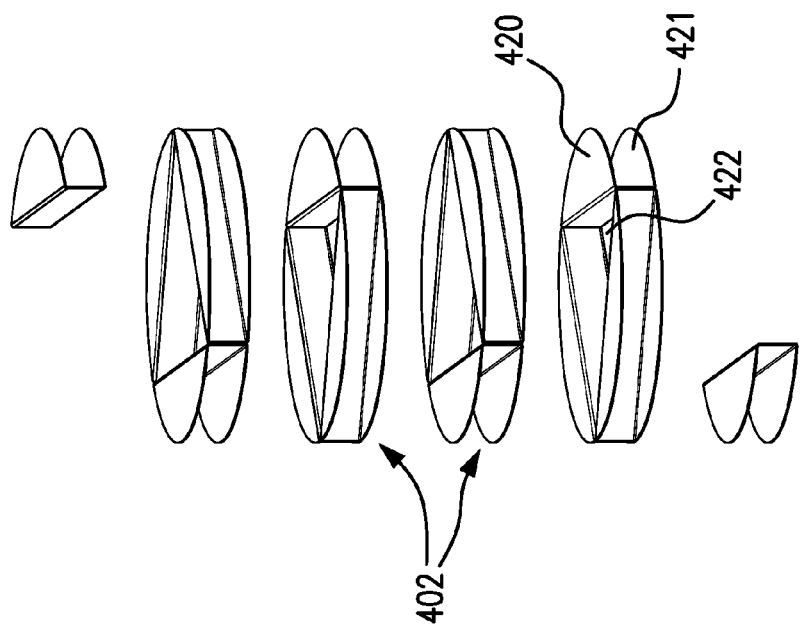
FIG. 5C: shows a schematic representation of further baffles according to the invention, on their own without the stirring vessel.

In FIGS. 4C and 4D, the construction of these elements is represented. While a relatively simple construction of the baffles 302 from two metal sheets 320 and 321 meeting at a joining line 322 is represented in FIG. 4C, FIG. 4D shows the stirring elements 304 assembled from a relatively large number of metal sheets 340 to 343. The stirring elements are attached on the stirring shaft or the shaft 30 and have the form of two pyramids arranged one inverted on the other. The stirring elements are radially offset in an angular manner in relation to one another. The baffles 302 comprise planar, sloping metal sheets, which are attached tangentially at a distance from the edges of the pyramids of the stirring elements. Along the center axis, the baffles are offset radially in an angular manner.

It is clear that, according to the invention, a large number of different forms of the individual elements and ways in which they are joined together are possible. FIG. 4E shows the interaction of the elements. On the inner circumferential surface (not represented) of the stirring vessel, the baffles 302 are attached in such a way that they occupy the clear space between the individual stirring elements 304 of the stirrer and make it much smaller. As a result of the large volumes of the stirring elements and the baffles, the molten glass is frequently directed through constrictions as it flows through the stirring vessel. The relative movement between these two stirring elements in these constrictions kneads the glass melt. The radially angularly offset arrangement of the stirring elements and the baffles has the effect that the stream of glass is multiply broken down by the stirring elements at each level.

The radially angular offset of the stirring elements makes it possible in the first place to lower the stirrer into the stirring vessel, by it being alternately lowered by the height of a stirring element and then turned by the angular offset.

FIGS. 5A to 5E show a further embodiment of the invention, in particular the construction of the baffles 402 in offset arrangement and the stirring elements 404 cooperating with them. In the case of the embodiment represented of the baffles 402, it is clear that they may be connected in pairs or all be connected to one another. This increases the stability of the stirring vessel (not represented). On the inner circumferential surface of the stirring vessel, baffles 402 are attached in such a way that they occupy the clear space between the individual stirring elements of the stirrer and make it much smaller. According to FIG. 5C, the baffles comprise planar vertical and horizontal metal sheets 420, 421, which are attached to the inner circumferential surface of the stirring vessel in such a way that they only leave an opening in the form of a triangular prism 422.

The stirring elements 404 (or stirring blades) have a horizontal cross-section smaller but similar in shape as the triangular space 422 left open by the baffles. Each stirring element is formed by two opposing horizontal triangular metal sheets 441 and closed at their circumference by three vertical jacket sheets 440.

Along the center axis of the stirring vessel, the baffles are offset radially in an angular manner. As a result of the large volumes of the stirring elements and the baffles, the molten glass is frequently directed through constrictions as it flows through the stirring vessel. The relative movement between these two stirring elements in these constrictions kneads the glass melt. The radially angularly offset arrangement of the stirring elements and the baffles has the effect that the stream of glass is multiply broken down by the stirring elements at each level.

The radially angular offset of the stirring elements makes it possible in the first place to lower the stirrer into the stirring vessel, by it being alternately lowered by the height of a stirring element and then turned by the angular offset.

Figure 6A:
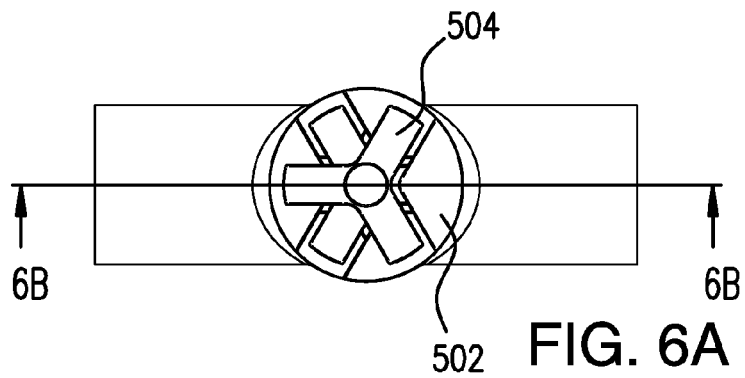
FIG. 6A: shows a schematic representation of a further stirring system according to the invention in the direction of the longitudinal axis, with a further embodiment according to the invention of a stirring vessel with the stirrer corresponding thereto.
Figure 6B:
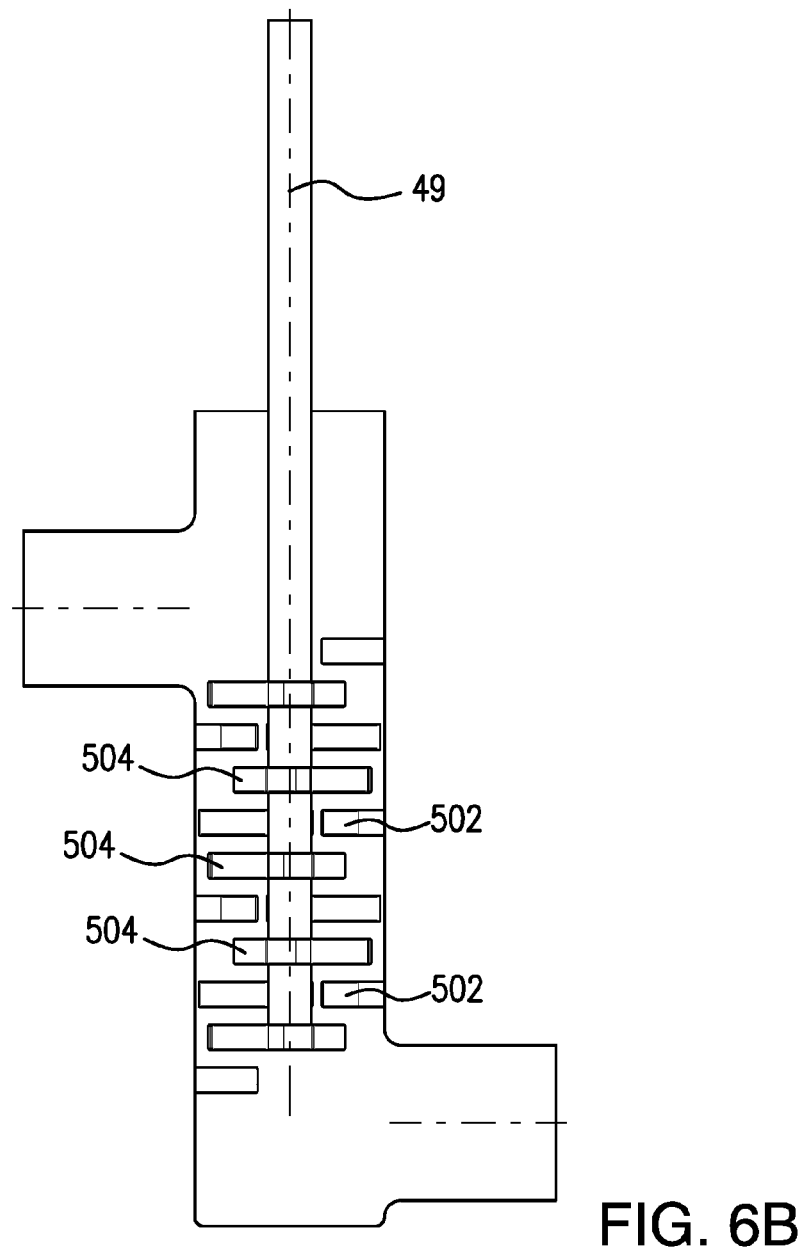
FIG. 6B: shows a schematic sectional representation along 6B-6B according to FIG. 6A.
Figure 6E:
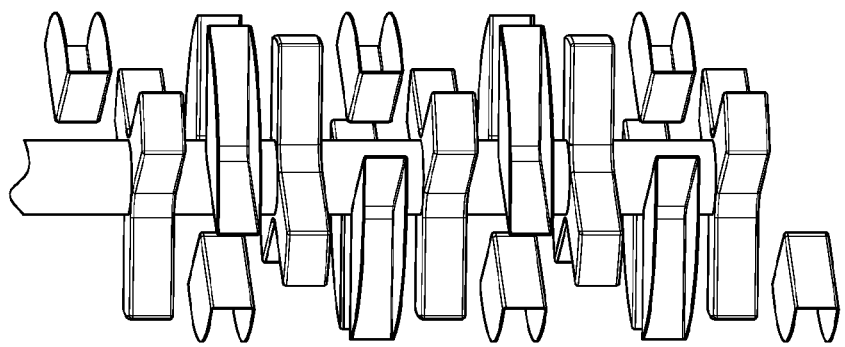
FIG. 6E: shows a representation of the interaction of the stirrer as shown in FIG. 6D and the baffle as shown in FIG. 6C.

FIGS. 6A to 6E show an embodiment with baffles 502 and stirring elements 504, which are likewise assembled from a number of metal sheets 520 to 523 as well as 540 and 541 and cooperate as in FIG. 6E.

Figure 6D:
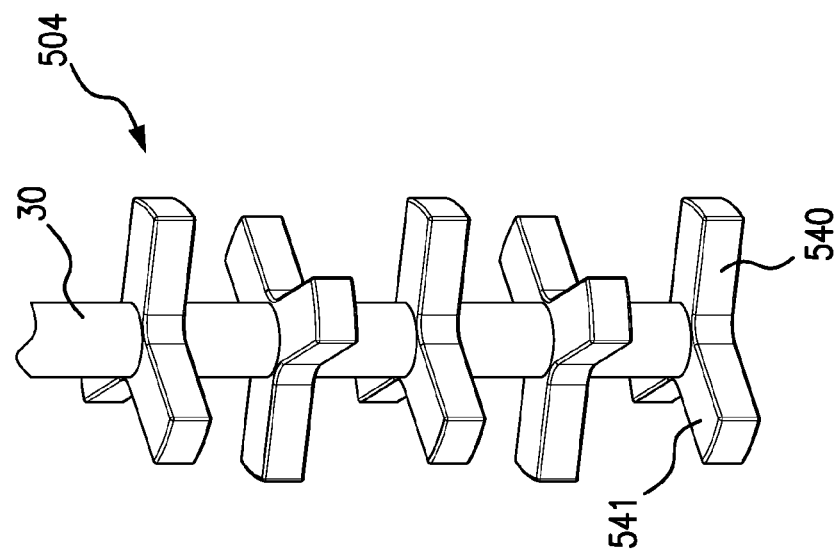
FIG. 6D: shows a perspective representation of a further stirrer according to the invention.

The individual prismatic stirring elements 504 that are attached on the stirring shaft 30 have a star-shaped base area, cf. FIG. 6D. The base area is orthogonal in relation to the axis of the stirring shaft. The stirring elements are offset radially in an angular manner in relation to one another.

Figure 6C:
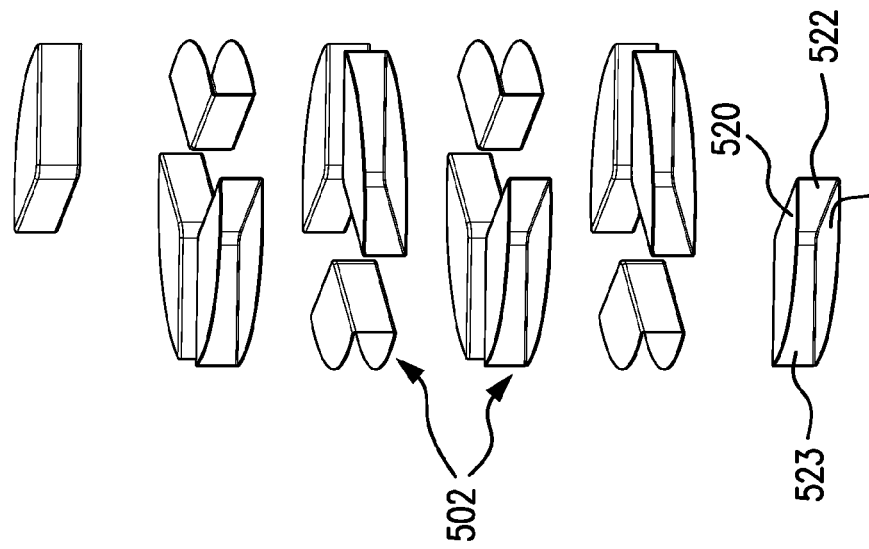
FIG. 6C: shows a schematic representation of further baffles according to the invention, on their own without the stirring vessel.

According to FIGS. 6C and 6E, the baffles 502 are attached to the inner circumferential surface (not shown) of the stirring vessel in such a way that they occupy the clear space between the individual stirring elements of the stirrer and make it much smaller. The baffles comprise planar vertical and horizontal metal sheets 522, 523 and 520, 521, which are attached to the inner circumferential surface of the stirring vessel in such a way that they only leave an opening in the form of a star. Along the center axis, the baffles are offset radially in an angular manner.

As a result of the large volumes of the stirring elements 504 and the baffles 502, the molten glass is frequently directed through constrictions as it flows through the stirring vessel. The relative movement between these two stirring elements in these constrictions kneads the glass melt. The radially angularly offset arrangement of the stirring elements and the baffles has the effect that the stream of glass is multiply broken down by the stirring elements at each level. The radially angular offset of the stirring elements makes it possible in the first place to lower the stirrer into the stirring vessel, by it being alternately lowered by the height of a stirring element and then turned by the angular offset.

The invention likewise comprises individual features shown in the figures, even if they are not shown in conjunction with other features and/or are not mentioned above or below.

The invention likewise comprises embodiments with any combination of features that are mentioned or shown above or below with respect to various embodiments.

The invention likewise comprises the precise or exact expressions, features, numerical values or ranges, etc. if these expressions, features, numerical values or ranges have been mentioned above or below in conjunction with expressions such as for example "approximately, about, around, essentially, generally, at least", etc. (that is to say "approximately 3" is intended likewise to include "3" or "essentially radially" is also intended to include "radially"). Moreover, the expression "respectively" means "and/or".

The invention claimed is:

1. A stirring system for molten glass with a stirring vessel and a stirrer,
    wherein the stirring system comprises:
    a. at least one stirrer with a shaft having a longitudinal axis and at least one stirring element,
    b. wherein the at least one stirring element has a contour that at least partially narrows along a length extending in a direction essentially transverse to the direction along which the longitudinal axis of the stirrer extends, with the contour narrowing as the length extends away from the shaft of the stirrer,
    c. wherein, in an operating state, the stirrer is rotatable in the stirring vessel,
    wherein the stirring vessel comprises:
    d. a longitudinal axis, and
    e. an inner circumferential surface,
    f. wherein the inner circumferential surface has at least two baffles that extend from the inner circumferential surface, or the wall thereof, into the interior of the stirring vessel,
    g. wherein the at least two baffles have contours that at least partially narrow along a length extending in a direction essentially transverse to the direction along which the longitudinal axis of the stirring vessel extends, with the contours of the at least two baffles narrowing as the length extends away from the inner circumferential surface of the stirring vessel, and wherein
    h. the narrowing contour of the at least one stirring element corresponds to the narrowing contours of the at least two baffles, and
    i. the configurations of the at least one stirring element and the at least two baffles are such that insertion of the stirrer into the stirring vessel requires at least: a first translatory movement of the stirrer along the longitudinal axis of the stirring vessel; a rotary movement of the stirrer about the longitudinal axis of the stirrer; and a second translatory movement of the stirrer along the longitudinal axis of the stirring vessel; with the rotary movement occurring subsequent to or simultaneously with the first translatory movement, and prior to the second translatory movement.

2. The stirring system as claimed in claim 1, wherein the at least two baffles are offset from one another around the longitudinal axis of the stirring vessel at an angle of 60°, 90°, 120°, or 180°.

3. The stirring system as claimed in claim 1, wherein the at least two baffles includes a number of baffles attached in at least two groups of at least two baffles, with the groups of baffles located at different vertical positions along the longitudinal axis of the stirring vessel, and with adjacent groups of baffles being offset from one another around the longitudinal axis of the stirring vessel.

4. The stirring system as claimed in claim 3, wherein the groups of baffles each comprise at least three baffles.

5. The stirring system as claimed in claim 3, wherein, in the operating state, the at least one stirring element includes a stirring element positioned vertically between two groups of baffles, and
    the narrowing contour of the stirring element between the two groups of baffles corresponds with the narrowing contours of the baffles in the two adjacent groups of baffles in that: a contour of the lower surface of the stirring element corresponds with contours of the upper surfaces of the baffles in the lower group of baffles, and a contour of the upper surface of the stirring element corresponds with contours of the lower surfaces of the baffles in the higher group of baffles.

6. The stirring system as claimed in claim 1, wherein the inner circumferential surface of the stirring vessel is essentially continuous and round in cross section.

7. The stirring system as claimed in claim 1, wherein the inner circumferential surface of the stirring vessel comprises at least one metal sheet and the at least two baffles are arranged fixedly on the metal sheet.

8. The stirring system as claimed in claim 7, wherein the at least two baffles are formed of at least one further metal sheet fixedly arranged on the metal sheet of the inner circumferential surface of the stirring vessel, optionally by welding or soldering.

9. The stirring system as claimed in claim 1, wherein the at least two baffles includes baffles having center portions that extend further into the interior of the stirring vessel than at least one of their respective lateral portions.

10. The stirring system as claimed in claim 1, wherein the at least two baffles are formed from one or more metal sheets, wherein
when formed from a single metal sheet, edges of the sheet are at least partly connected to the inner circumferential surface of the stirring vessel with a transitional line present between two ends of the sheet, and
when formed from two or more metal sheets, edges of the sheets are at least partly connected to the inner circumferential surface of the stirring vessel with one or more joining lines between the one or more sheets.

11. The stirring system as claimed in claim 1, wherein the at least two baffles includes baffles having at least a first face, having a first orientation, and a second face a second orientation that differs from the first orientation.

12. The stirring system as claimed in claim 11, wherein the first and second faces are inclined in relation to one another at an angle of approximately 30° to 120°.

13. The stirring system as claimed in claim 1, wherein the contour of the at least one stirring element that at least partially narrows along a length extending away from the shaft comprises an envelope.

14. The stirring system as claimed in claim 1, wherein the at least one stirring element includes a number of stirring elements arranged in at least two groups of at least two stirring elements different vertical positions along the longitudinal axis of the stirrer, with adjacent groups of stirring elements offset from one another around the longitudinal axis of the stirrer.

15. The stirring system as claimed in claim 1, wherein at least glass contacting components of the stirring system consist essentially of an oxide-dispersion-hardened PGM material.

16. The stirring system as claimed in claim 15, wherein the at least two baffles and/or the at least one stirring element has/have clearances that reduce weight and/or provide constrictions for molten glass that passes therethrough.

17. A method for assembling a stirring system for molten glass as claimed in claim 1, with the following method steps:
a. introducing the stirrer into the stirring vessel by a first translatory movement of the stirrer along the longitudinal axis of the stirring vessel,
b. subsequent to or simultaneous with the first translatory movement, rotating the stirrer, about the longitudinal axis of the stirrer, and
c. subsequent to rotating the stirrer, continuing insertion of the stirrer by a second translatory movement of the stirrer along the longitudinal axis of the stirring vessel.

18. A method for stirring molten glass with a stirring system as claimed in claim 1, with the following method steps:
a. feeding molten glass through an inlet of the stirring vessel,
b. turning the stirrer in the stirring vessel and passing the molten glass through the interior of the stirring vessel,
c. the molten glass being directed through constrictions between the at least one stirring element and the at least two baffles such that the glass is broken down, kneaded and/or compressed, and
d. discharging the molten glass through an outlet of the stirring vessel.

19. A stirring system for molten glass with a stirring vessel and a stirrer,
wherein the stirring system comprises:
a. at least one stirrer with a shaft having a longitudinal axis and at least one stirring element,
b. wherein the at least one stirring element has a contour that at least partially narrows along a length extending in a direction essentially transverse to the direction along which the longitudinal axis of the stirrer extends, with the contour narrowing in a height direction as the length extends away from the shaft of the stirrer,
c. wherein, in an operating state, the stirrer is rotatable in the stirring vessel,
wherein the stirring vessel comprises:
d. a longitudinal axis, and
e. an inner circumferential surface,
f. wherein the inner circumferential surface has at least two baffles that extend from the inner circumferential surface, or the wall thereof, into the interior of the stirring vessel,
g. wherein the at least two baffles have contours that at least partially narrow along a length extending in a direction essentially transverse to the direction along which the longitudinal axis of the stirring vessel extends, with the contours of the at least two baffles narrowing in a height direction as the length extends away from the inner circumferential surface of the stirring vessel
and wherein
h. the narrowing contour of the at least one stirring element corresponds to the narrowing contours of the at least two baffles, and
i. the configurations of the at least one stirring element and the at least two baffles are such that the stirrer cannot be placed into an operating state, from outside the stirring vessel, by a translatory movement alone.

20. A stirring system for molten glass with a stirring vessel and a stirrer,
wherein the stirring system comprises:
a. at least one stirrer with a shaft having a longitudinal axis and at least one stirring element,
b. wherein the at least one stirring element has a contour that at least partially narrows along a length extending in a direction essentially transverse to the direction along which the longitudinal axis of the stirrer extends, with the contour narrowing as the length extends away from the shaft of the stirrer,
c. wherein, in an operating state, the stirrer is rotatable in the stirring vessel,
wherein the stirring vessel comprises:
d. a longitudinal axis, and
e. an inner circumferential surface,
f. wherein the inner circumferential surface has at least two baffles that extend from the inner circumferential surface, or the wall thereof, into the interior of the stirring vessel,
g. wherein the at least two baffles have contours that at least partially narrow along a length extending in a direction essentially transverse to the direction along which the longitudinal axis of the stirring vessel extends, with the contours of the at least two baffles narrowing as the length extends away from the inner circumferential surface of the stirring vessel and wherein
- h. at least a portion of the narrowing contour of the at least one stirring element presents a profile that mirrors a profile presented by at least a portion of the narrowing contours of the at least two baffles.

* * * * *